United States Patent
Huck et al.

(10) Patent No.: US 7,619,340 B2
(45) Date of Patent: Nov. 17, 2009

(54) DRIVE UNIT WITH A ROTATIONALLY FIXED BEARING ELEMENT

(75) Inventors: Thomas Huck, Rheinmuenster (DE); Tarek Mili, Karlsruhe (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 11/994,951

(22) PCT Filed: Sep. 11, 2006

(86) PCT No.: PCT/EP2006/066202

§ 371 (c)(1),
(2), (4) Date: Jan. 7, 2008

(87) PCT Pub. No.: WO2007/039406

PCT Pub. Date: Apr. 12, 2007

(65) Prior Publication Data

US 2008/0203840 A1    Aug. 28, 2008

(30) Foreign Application Priority Data

Sep. 30, 2005 (DE) .................. 10 2005 047 444

(51) Int. Cl.
  *H02K 5/16* (2006.01)
(52) U.S. Cl. .................................................. 310/90
(58) Field of Classification Search ............ 310/90, 310/91

See application file for complete search history.

(56) References Cited

U.S. PATENT DOCUMENTS

| 2,193,713 | A | * | 3/1940 | Cole ........................... 384/415 |
| 3,770,331 | A |   | 11/1973 | Seller et al. |
| 3,831,048 | A |   | 8/1974 | Wagner |
| 3,846,652 | A | * | 11/1974 | Lykes ........................... 310/90 |
| 2004/0130226 | A1 | * | 7/2004 | Yoshida et al. .................. 310/81 |

FOREIGN PATENT DOCUMENTS

| DE | 1 638 213 | 4/1971 |
| DE | 195 41 118 | 3/1997 |
| DE | 103 52 240 | 2/2005 |
| FR | 2 319 994 | 2/1977 |

* cited by examiner

*Primary Examiner*—Nguyen N Hanh
(74) *Attorney, Agent, or Firm*—Michael J. Striker

(57) ABSTRACT

The invention relates to a drive unit (10) and to a method for producing said drive unit, especially for adjusting mobile parts in a motor vehicle. Said drive unit comprises a drive shaft (12), received in a housing (24) by means of at least one bearing element (22). Said housing comprises a lower housing part (26) and an upper housing part (28) which can be radially assembled in relation to the drive shaft (12). The bearing element (22) is configured as a plain bearing bush (38) that positively engages in a peripheral direction (33) in a corresponding bearing seat (30) of the housing (24) in order to form a rotational lock (42).

10 Claims, 2 Drawing Sheets

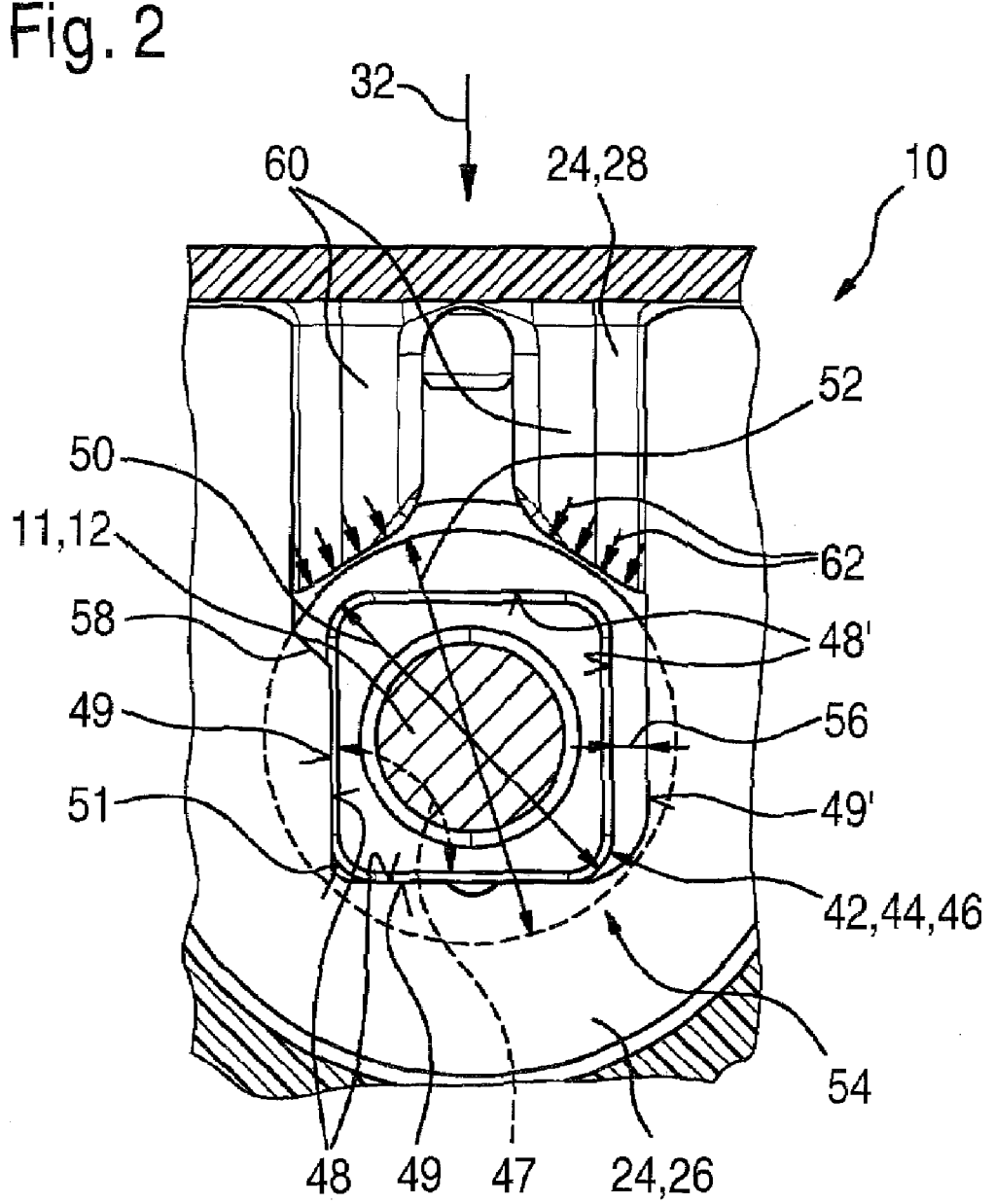

DRIVE UNIT WITH A ROTATIONALLY FIXED BEARING ELEMENT

RELATED ART

The present invention relates to a drive unit, in particular for adjusting movable parts in a motor vehicle, and a method for manufacturing such a drive unit with a drive shaft that is supported in a housing using at least one bearing element, according to the preamble of the independent claims.

Publication DE 10352240 A1 makes known an electric motor, the housing of which is composed of two half shells, which are installable radially to the armature shaft. The armature shaft and a further transmission shaft are supported in a first housing shell using bearing elements. By installing the shaft in such a radial manner, the bearing elements are typically prevented from rotating via a radial contact force. The radial contact force must be so great that the related friction forces are greater than the initial friction of the bearing element. Given that the level of the contact force is specified by the rotational lock of the bearing element, it is very difficult to bring the shaft into an exact radial position, since the radial positioning is also greatly influenced by the contact force.

DISCLOSURE OF THE INVENTION

The inventive drive unit and the manufacturing method with the characterizing features of the independent claims have the advantage that, by integrally forming a rotational lock with the bearing element, the bearing element engages in a corresponding bearing seat of the housing in a form-fit manner. As a result, the bearing element is prevented from rotating in the circumferential direction by the form-fit connection between the bearing element and the housing. The radial contact force on the bearing element may therefore be adjusted entirely independently of the rotational lock. The shaft may therefore be positioned very exactly via the contact force applied by the second housing part.

Advantageous refinements and improvements of the features indicated in the independent claims are made possible by the measures listed in the subclaims. When, in order to rotationally lock the bearing element, a geometry with a polygonal outline as the outer circumference or a related external profile is integrally formed with the bearing element as the form-fit connection, it is very easy to manufacture a reliable form-fit connection with the bearing seat. The polygonal geometry is preferably designed, e.g., as a square, which engages in a corresponding U-shaped recess in the bearing seat. As a result of this form-fit connection, additional securing elements such as clamping disks may be eliminated entirely, thereby enabling the drive unit to be manufactured more quickly and cost-favorably. By designing the plain bearing bush as a single piece with the polygonal geometry, no additional effort is required to manufacture the bearing element.

When the form-fit rotational lock is integrally formed with the bearing element on its axial end, this does not interfere with the plain bearing bush being accommodated in the bearing seat of the housing. Depending on the torques that act on the bearing element, a polygonal geometry may be integrally formed on the plain bearing bush, on one or both axial ends.

It is advantageous when the bearing element is designed as a calotte bearing, since it may absorb radial forces from various directions, and it compensates for the deflection of the drive shaft during installation and operation. By using sintered metal that can absorb a lubricant, the shaft is supported in a manner such that it may glide easily for the duration of its service life.

To ensure that the functionality of the spherical cap is not impaired, and to ensure that it may continue to compensate for deflections in the drive shaft, the outer diameter of the form-fit rotational lock is designed to be smaller than the minimum outer diameter of the spherical cap. The rotational locking of the bearing element may therefore be decoupled from the actual function of the shaft bearing.

To accommodate the polygonal geometry, the bearing seat includes a rotational lock region, into which the rotational lock may be inserted in a form-fit manner. Very favorably, the rotational lock region, together with the bearing seat, may be designed directly as a single piece with the lower housing part, which may be manufactured, e.g., using a plastic injection-molding method.

To ensure that the bearing element may be inserted very easily in the corresponding bearing seat during installation, the polygonal geometry bears—in the fully installed state—against the rotational lock region of the bearing seat with exactly two surfaces or edges of each rotational lock. The two surfaces form an angle with each other in which two corresponding mating surfaces of the rotational lock region engage in a form-fit manner. The polygonal geometry is preferably designed as a square, which bears against two mating surfaces of the rotational lock region that form an angle with each other of approximately 90°.

When the bearing seat is formed directly in the lower housing part, the bearing element may be pressed easily into the bearing seat when the second housing part is installed. To this end, a projection may be integrally formed, e.g., as one piece with the second housing part, the projection bearing directly against the spherical cap when in the installed state.

To ensure that the bearing element that accommodates the shaft automatically moves into the correct rotational position when it is installed radially, the rotational lock region includes an insertion chamfer. The form-fit rotational lock of the bearing element may glide along the insertion chamfer and be rotated via the radial installation force such that it forms a form-fit connection with the rotational lock region.

Via the inventive method for manufacturing the drive unit, the bearing element may be fixed securely in position radially in one installation process without using any additional components, and it may be simultaneously secured against rotation. Due to the self-finding rotational lock, the bearing element is automatically secured against rotation via its correct radial positioning.

When the bearing element is installed, the contact force used to position it radially may be adjusted entirely independently of frictional forces on the surface of the bearing element. According to the related art, the frictional forces are intended to prevent the bearing element from rotating.

DRAWING

An exemplary embodiment of the inventive device is presented in the drawing, and it is described in greater detail in the description below.

FIG. 2 shows a cross section through a fully installed drive unit.

DETAILED DESCRIPTION OF THE EXEMPLARY EMBODIMENT

Figure 1:
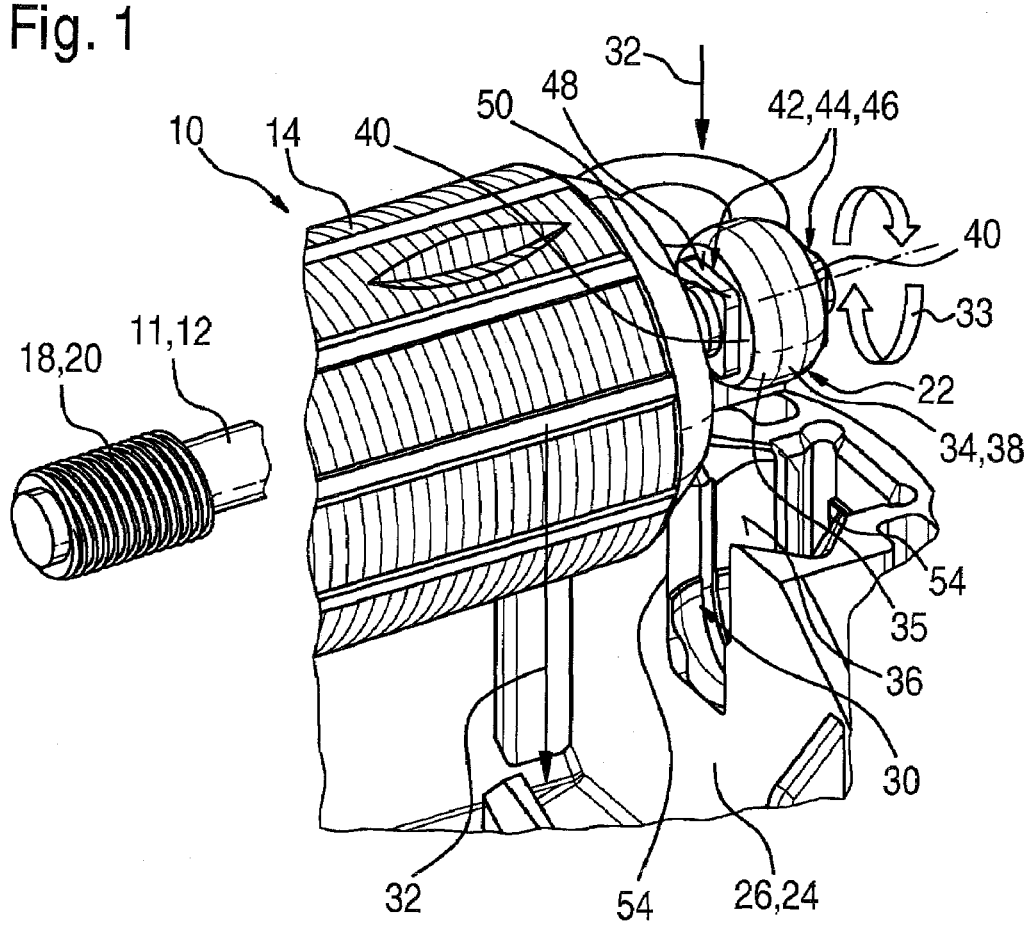
FIG. 1 shows a view of the drive unit before it is installed.

In FIG. 1, an electric motor 10 is shown as drive unit 10, with which an armature shaft 11 is designed as drive shaft 12. Drive shaft 12 is driven by an armature 14 mounted thereon and transfers a torque using a driven element 16—which is designed, e.g., as a worm 20—to a not-shown, movable part in the motor vehicle. Drive shaft 12 is supported in a housing 24 using bearing elements 22. Housing 24 includes a lower housing part 26 and an upper housing part 28. A bearing seat 30 is formed in lower housing part 26, which is made, e.g., of plastic. Bearing element 22 may be inserted in bearing seat 30 in radial direction 32 relative to drive shaft 12. Bearing element 22 includes a spherical cap 34, curved surface 35 of which bears against an inner wall 36 of bearing seat 30. Spherical cap 34 is designed as a plain bearing bush 38 made, e.g., of a sintered metal, and rotatably accommodates drive shaft 12. A form-fit rotational lock 42 is located on axial ends 40 of plain bearing bush 42, and is designed with a polygonal geometry 44. In this exemplary embodiment, polygonal geometry 44 is designed as square 46, with which four surfaces 48 form angles of approximately 90° with each other. Surfaces 48 are interconnected with a radius 51 that makes it easier to insert bearing element 22 into bearing seat 30. The maximum diameter 50 of form-fit rotational lock 42 is smaller than minimum outer diameter 52 of plain bearing bush 38. Bearing seat 30 includes a rotational lock region 54 into which its rotational lock 42 engages in a form-fit manner after bearing element 22 is installed. Rotational lock region 54 includes mating surfaces 49, against which surfaces 48 of polygonal geometry 44 bear after bearing element 22 has been installed.

Drive unit 10 is shown in the fully installed state in FIG. 2. Rotational lock 42 of bearing element 22 forms a form-fit connection with rotational lock region 54 of bearing seat 30. Exactly—and only—two adjacent surfaces 48 bear against corresponding mating surfaces 49 in this case. Using square 46 as an example, surfaces 48 and mating surfaces 49 form an angle 47 of approximately 900. Third and fourth surfaces 48' of square 46 do not bear against a mating surface 49. Instead, they are located at a distance 56 from mating surface 49', to make it easier to insert rotational lock 42 into rotational lock region 54. For this purpose, rotational lock region 54 also includes an insertion phase 58, along which polygonal geometry 44 glides, to form a form-fit connection in rotational lock region 54. Plain bearing bush 38 is pressed by an extension 60 of upper housing part 28 against inner wall 36 of bearing seat 30.

To install drive unit 10, bearing element 22 is slid onto drive shaft 12. Bearing element 22 and drive shaft 12 are then inserted into bearing seat 30 of lower housing part 26 in radial direction 32. Surface 35 of plain bearing bush 38 bears against corresponding inner surface 36 of bearing seat 30. When form-fit rotational lock 42 is inserted, it glides on insertion phase 58 into rotational lock region 54. If surfaces 48 are not oriented parallel to mating surfaces 49 upon insertion, rotational lock 42 rotates with plain bearing bush 38 in circumferential direction 33 until surfaces 48, 49 are nearly parallel and bearing element 22 is inserted fully into receptacle 30. The two surfaces 48, which form angle 47, and mating surfaces 49 are positioned relative to drive shaft 12 such that they form a form-fit connection when bearing element 22 has been pressed in completely. Due to distance 56 between surface 48' and mating surface 49', rotational lock 42 is prevented from tilting when it is inserted. An additional assembly step is therefore not required to reliably locate the rotational position of polygonal geometry 44. Next, upper housing part 28 is placed on lower housing part 26 and is connected therewith. Radial extension 60 exerts a contact force 62 on plain bearing bush 38, in particular on spherical cap 34, and presses it into bearing seat 30 in order to position drive shaft 30 radially.

It should be noted that, with regard for the exemplary embodiments presented in the figures and the description, many different combinations of the individual features are possible. For example, the specific design of form-fit rotational lock 42 may be varied, by designing polygonal geometry 44, e.g, as a triangle, a pentagon, or a hexagon. Rotational lock 42 may also have a curved circumference, e.g., an oval, which also forms a form-fit connection with related rotational lock region 54. Surfaces 48 and mating surfaces 49 need not be designed as extended surfaces. They may be designed as edges, for example. The form-fit connection is preferably formed by two surfaces 48, which are positioned relative to each other at angle 47, e.g., of approximately 90°. More than two surfaces 48 with different angles 47 may also form a form-fit connection with mating surfaces 49 of rotational lock region 54. The present invention is not limited to the use of calotte bearings 34. It may also be used for other sliding bearings or roller bearings.

What is claimed is:

1. A drive unit (10) for adjusting movable parts in a motor vehicle, with a drive shaft (12), which is supported in a housing (24) using at least one bearing element (22), the housing (24) including a lower housing part (26) and an upper housing part (28), configured to be joined radially relative to the drive shaft (12), wherein the bearing element (22) is designed as a plain bearing bush (38) to engage in a bearing seat (30) of the housing (24) in a form-fit manner in a circumferential direction (33) to form a rotational lock (42), and wherein a polygonal geometry (44) bears via only two surfaces (48) against two mating surfaces (49) of a rotational lock region (54), the two surfaces (48) forming an angle (47) of approximately 90°.

2. A drive unit (10) for adjusting movable parts in a motor vehicle, with a drive shaft (12), which is supported in a housing (24) using at least one bearing element (22), the housing (24) including a lower housing part (26) and an upper housing part (28), configured to be joined radially relative to the drive shaft (12), wherein the bearing element (22) is designed as a plain bearing bush (38) to engage in a bearing seat (30) of the housing (24) in a form-fit manner in a circumferential direction (33) to form a rotational lock (42), and wherein the bearing seat (30) includes an insertion chamfer (58) in a rotational lock region (52), which allows the polygonal geometry (44) to glide into a rotational lock region (54) in a self-finding manner when the bearing element (22) is installed.

3. A method for manufacturing a drive unit (10) for adjusting movable parts in a motor vehicle, the drive unit (10) comprising a drive shaft (12), which is supported in a housing (24) using at least one bearing element (22), the housing (24) including a lower housing part (26) and an upper housing part (28) configured to be joined radially relative to the drive shaft (12), wherein the bearing element (22) is designed as a plain bearing bush (38) to engage in a bearing seat (30) of the housing (24) in a form-fit manner in the circumferential direction (33) to form a rotational lock (42), and to include an insertion chamfer (58) in a rotational lock region (52), which allows a polygonal geometry (44) to glide into a rotational lock region (54) in a self-finding manner when the bearing element (22) is installed, the method of manufacturing comprising the following assembly steps:

sliding the at least one bearing element (22) onto the drive shaft (12), radially inserting the bearing element (22) with the drive shaft (12) into the bearing seat (30) of the lower housing part (26) to integrally form the rotational lock (42) with the bearing element (22), which integral lock during rotation bears against the corresponding rotational lock region (54) of the bearing seat (30) in a form-fit manner relative to its circumferential direction (33), and placing the upper housing part (28) on the lower housing part (26) to radially connect it therewith such that radial extension (60) of the upper housing part (28) presses the bearing element (22) into the bearing seat (30) in order to position the drive shaft (12) exactly.

4. The drive unit (10) as recited in claim 3,
wherein the rotational lock (42) is designed with a square polygonal geometry (44), and is integrally formed as one piece with the plain bearing bush (38).

5. The drive unit (10) as recited in claim 3,
wherein the form-fit rotational lock (42) is located on one or both axial ends (40) of the plain bearing bush (38).

6. The drive unit (10) as recited in claim 3,
wherein the bearing element (22) is designed as a spherical cap (34) from sintered metal.

7. The drive unit (10) as recited in claim 3,
wherein the diameter (52) of the spherical cap (42) across its entire axial width is greater the maximum diameter (50) of the polygonal geometry (44) of the rotational lock (42).

8. The drive unit (10) as recited in claim 3,
wherein the bearing seat (30) has a rotational lock region (54), which forms a form-fit connection with the polygonal geometry (44) of the rotational lock (42) in the circumferential direction (33).

9. The drive unit (10) as recited in claim 3,
wherein the bearing seat (30) is designed as a recess (30) in the lower housing part (26), into which the bearing element (22) is pressed via an extension (60) of the second housing part (28).

10. The method as recited in claim 3,
wherein the rotational lock (43) functions independently of the contact force (62) applied to a spherical cap (34) of the bearing element (22).

\* \* \* \* \*